United States Patent [19]

Morita et al.

[11] Patent Number: 4,778,860

[45] Date of Patent: Oct. 18, 1988

[54] THERMOSETTING RESIN COMPOSITION

[75] Inventors: Yoshitsugu Morita; Shoichi Shida, both of Chiba, Japan

[73] Assignee: Toray Silicone Company, Ltd., Tokyo, Japan

[21] Appl. No.: 90,885

[22] Filed: Aug. 31, 1987

[30] Foreign Application Priority Data

Sep. 4, 1986 [JP] Japan ............................... 61-208616

[51] Int. Cl.$^4$ .............................................. C08L 77/00
[52] U.S. Cl. ................................... 525/431; 525/474; 525/476; 525/477; 525/478; 524/861; 524/862; 524/413; 524/424; 524/425; 524/448; 524/451; 524/437; 524/428; 524/786; 524/789; 524/788; 524/785; 524/796; 524/588; 524/779
[58] Field of Search .............. 525/476, 474, 431, 477, 525/478; 524/861, 862, 413, 424, 425, 448, 451, 437, 428, 786, 788, 789, 785, 796, 779, 588

[56] References Cited

U.S. PATENT DOCUMENTS

| | | | |
|---|---|---|---|
| 4,385,158 | 5/1983 | Mikami et al. | 525/476 |
| 4,652,618 | 3/1987 | Sumida et al. | 525/478 |
| 4,663,397 | 5/1987 | Morita et al. | 525/477 |

*Primary Examiner*—Melvyn I. Marquis
*Attorney, Agent, or Firm*—Robert Spector

[57] ABSTRACT

The water permeability of cured thermosetting organic resin compositions is reduced and the dimensional stability of these compositions during molding is improved by the addition to the curable resin composition of a finely divided, cured organosiloxane material prepared from a curable organopolysiloxane, a curing agent for the organopolysiloxane, an optional silica filler and an aromatic hydrocarbon compound containing a substituted benzene ring where the substituent is a monovalent ethylenically unsaturated hydrocarbon radical or an alkenyloxy radical.

6 Claims, No Drawings

THERMOSETTING RESIN COMPOSITION

BACKGROUND OF THE INVENTION

1. Field of the Invention

The present invention relates to a thermosetting resin composition. More specifically, the present invention relates to a thermosetting resin composition which, by means of the addition of a cured powder having a good affinity for the thermosetting resin, affords a cured product which has a reduced water infiltration compared to prior cured powders, as well as an excellent flexibility, a low coefficient of thermal expansion, and a low mold shrinkage ratio.

2. Description of the Prior Art

Thermosetting resin compositions have excellent electrical properties, including dielectric properties, volume resistivity, and dielectric breakdown strength, in addition to excellent mechanical properties, such as flexural strength, compression strength, and impact strength. As a consequence these compositions are widely used as insulating materials in various electric and electronic parts through the use of such methods as transfer molding, injection molding, potting, casting, powder coating, immersion, and dripping.

A disadvantage of thermosetting resins is that they are generally rigid. When these resins are used, for example, to seal electric or electronic parts, large mechanical stresses are imparted to the interior elements. As a consequence, the elements may not function properly or parts of the elements may be broken. The stress develops due to the difference in thermal expansion coefficient and post-molding shrinkage ratio between the thermosetting resin and the elements of electric or electronic parts. Electric and electronic parts have very low thermal expansion coefficients and shrinkage ratios, while the resins have large values for these characteristics. These large difference results in generation of the aforementioned excessive internal stresses to the elements and other constituent materials of electric/electronic parts during molding, baking and subsequent thermal cycles.

The difference in thermal expansion coefficients and post-mold shrinkage is also responsible for the appearance of cracks in the thermosetting resin itself and for the appearance of spaces between the electric/electronic component and the thermosetting resin. These participate in deterioration of the element due to the infiltration of water and other impurities into these spaces.

While their object has not been to improve the thermal expansion coefficient and post-molding shrinkage ratio of thermosetting resins, efforts have been made at improving the properties of thermosetting resins. For example, Japanese Patent Publication No. 77/36,534 concerns an improvement in the lubricating properties of the surface of resin moldings which is achieved by blending organopolysilsesquioxane powder into phenolic resins, and Laid Open Japanese Patent Application (Kokai) 52/14,643, published on Feb. 3, 1977 relates to increasing the abrasion resistance to metal through the use of a synthetic resin filler comprising the finely divided powder of a cured material based on organopolysiloxane and an inorganic filler. However, these are both unsatisfactory in terms of the thermal expansion coefficient, post-molding shrinkage, and flexural modulus.

U.S. Pat. No. 4,663,397, which issued to Morita and Shirahata on May 5, 1987 discloses thermosetting resin compositions comprising 100 parts by weight of a continuous phase of a curable thermosetting resin composition and from 1 to 100 parts by weight of a finely divided, cured polyorganosiloxane resin wherein at least 90 weight percent of said polyorganosiloxane resin consists essentially of $R^1R^2R^3SiO_{0.5}$ units and $R^4SiO_{1.5}$ units, with any remainder consisting essentially of at least one member selected from $R^5R^6SiO_{0.5}$ units and $SiO_{4/2}$ units, where each of $R^1$, $R^2$, $R^3$, $R^4$, $R^5$, and $R^6$ represents a hydrogen atom, a monovalent hydrocarbon radical, or a monovalent substituted hydrocarbon radical, and the molar ratio of $R^1R^2R^3SiO$ units to $R^4SiO_{0.5}$ is from 0.1 to 3.

In their copending U.S. application Ser. No. 29,037 filed on Mar. 23, 1987 the present applicants disclose curable thermosetting resin compositions comprising a continuous phase of a curable thermosetting organic resin or a curable thermosetting silicone resin containing a dispersed finely divided particles of a cured composition prepared by reacting (1) an organopolysiloxane, (2) a curing agent for the organopolysiloxane, (3) an alkoxy substituted organosilicon compound and (4) a compound of aluminum or zirconium where said compound is an alkoxide, phenoxide, carboxylate or a derivative of a beta-dicarbonyl compound or a o-hydroxyketone. The presence of ingredients (3) and (4) imparts improved adhesion between the continuous and dispersed phases of the composition.

In Japanese Laid Open Patent Application (Kokai) No. 58/219218, published on Dec. 20, 1983 the present inventors proposed another solution to the aforementioned problems of reducing internal stresses and the mold shrinkage ratio of thermosetting resin compositions by blending a finely divided cured material containing 10 wt % linear siloxane fraction into a thermosetting resin.

Furthermore, in Japanese Laid Open Application (Kokai) No. 59/96122, published on June 2, 1984, the present inventors propose a method using a spherical cured material which is cured to the elastomer while in the sprayed state. However, when any of the aforementioned finely divided cured materials or microfine spherical cured material is blended into a thermosetting resin, the problem arises that water easily infiltrates into the gaps generated between the thermosetting resin and the finely particulate cured material as a consequence of the latter's poor affinity for the thermosetting resin. This is particularly true of material consisting of 100 wt % linear siloxane fraction.

Taking into consideration these problems residing in the prior art, the objective of the present invention is to provide, by means of the addition to the thermosetting resin of a finely divided cured material exhibiting a time-invariant affinity for the resin, a thermosetting resin composition which affords moldings having a reduced water infiltration compared with the use of prior finely divided cured materials, and in particular having a high flexibility, a small thermal expansion coefficient, and a small mold shrinkage ratio. Furthermore, this is to be accomplished without mold soiling or exudation onto the surface of the cured product during molding.

SUMMARY OF THE INVENTION

The objective of the present invention is achieved by using as the dispersed phase of a thermosetting resin composition a finely divided organopolysiloxane material obtained by curing an organopolysiloxane in the presence of from 0.1 to 50 percent, based on the weight of curable organopolysiloxane, an aromatic hydrocarbon compound of containing an ethylenically unsaturated hydrocarbon radical as a substituent or a reaction product of said aromatic hydrocarbon compound with an organohydrogensiloxane.

DETAILED DESCRIPTION OF THE INVENTION

This invention provides a thermosetting resin composition (A) 100 parts by weight of a continuous phase comprising a thermosetting organic resin or a thermosetting silicone resin and (B) from 0.1 to 100 parts by weight of a finely divided dispersed phase consisting essentially of the finely divided product obtained by curing a composition comprising (i) 100 parts by weight of a curable organopolysiloxane having a viscosity of at least 0.01 Pa.s at 25° C.

(ii) from 0 to 100 parts by weight of a filler, (iii) from 0.3 to 100 parts by weight of a curing agent for said organopolysiloxane, and (iv) from 0.1 to 50 parts by weight of a substituted aromatic hydrocarbon compound comprising a benzene ring having at least one substituent selected from monovalent ethylenically unsaturated hydrocarbon radicals or alkenyloxy radicals.

The inventive feature that characterizes the present compositions and distinguishes them from similar compositions described in the prior art is the presence in the dispersed phase of the substituted aromatic hydrocarbon compound identified hereinabove as component (iv). This ingredient is responsible for the improved properties, particularly reduced shrinkage and water permeability, exhibited by the present thermosetting resin compositions.

The composition of each component of the present compositions will now be described in detail.

The thermosetting resin comprising component (A) is the base material of the present compositions. Any of the known organic and silicone type thermosetting resins are suitable for use as the continuous phase of the present compositions. Examples of thermosetting organic resins include but are not limited to phenolic resins, formaldehyde resins, xylene resins, xylene/formaldehyde resins, ketone/formaldehyde resins, furan resins, urea resins, imide resins, melamine resins, alkyd resins, unsaturated polyester resins, aniline resins, sulfonamide resins, silicone resins, epoxy resins, and copolymers obtained by reacting two or more of these resins. Among these various resins, phenolic resins, imide resins, epoxy resins and silicone resins are particularly preferred.

Component (A) can be a single resin or a mixture of two or more resins. In addition to the resin itself, the thermosetting resin composition can also contain additional ingredients including but not limited to fillers as specified for component (ii) of component (B) of the present compositions, thermosetting resin curing agents, curing catalysts, higher fatty acid metal salts, ester waxes, and plasticizers.

Component (B) of the present compositions is a cured material obtained from a composition comprising components (i) through (iv) identified hereinabove. Component (ii), a filler, is optional. It is this component (B), when finely divided and dispersed in component (A), which functions to prevent water infiltration due to the good bonding existing between the thermosetting resin comprising component (A) and the finely divided cured material comprising component (B), and which functions to flexibilize the thermosetting resin and reduce the thermal expansion coefficient, post-molding shrinkage, and post-baking shrinkage.

The organopolysiloxane comprising component (i) is the principal material of component (B).

Because the organopolysiloxanes suitable for use as component (i) range from straight-chain types to branch and network type resins and mixtures of these two types of materials, the viscosity of this component at 25° C. will range over the broad range of from 0.01 Pascal seconds (Pa.s) to that of a gum or solid. Viscosities below 0.01 Pa.s are undesirable since the cured material will then have brittle physical properties. Straight-chain materials having a viscosity of at least 0.05 Pa.s are preferred.

The organic groups bonded to silicon in the siloxane units of component (i) are identical or different monovalent hydrocarbon radicals that can be unsubstituted or substituted. Useful radicals include but are not limited to alkyl radicals groups such as methyl, ethyl, propyl, and butyl; cycloalkyl radicals such as cyclohexyl; alkenyl radicals such as vinyl and allyl; aryl radicals such as phenyl and xylyl; aralkyl radicals such as phenylethyl; and halogenated monovalent hydrocarbon groups such as gamma-chloropropyl and 3,3,3-trifluoropropyl. Among these, methyl, vinyl, and phenyl are used most frequently, and methyl in particular is used most often. The terminal groups of the organopolysiloxane can be for example, hydroxyl, alkoxy, or triorganosiloxy groups such as trimethylsiloxy, dimethylvinylsiloxy, dimethylphenylsiloxy and methylvinylphenylsiloxy.

The type of monovalent hydrocarbon radicals in the siloxane unit, the type of molecular terminal groups, and the viscosity of component (i) are selected from a consideration of the application and the type of curing agent selected.

While it is preferred that only straight-chain organopolysiloxane be used as component (i), organopolysiloxane resins can be used in combination with straight-chain organopolysiloxane or these resins can be used alone. No particular restrictions on the organopolysiloxane resin are required if the resin is used in combination with other organosiloxane materials. However, when these resins are used as the entire portion of component (i), because this component must impart flexibility to the thermosetting resin when it is blended into component (A), the organopolysiloxane resin must contain at least 10 mol %, preferably at least 30 mol %, of $R_2SiO$ units, where R represents a monovalent hydrocarbon radical. In addition, at least 1 and preferably many linear organopolysiloxane blocks represented by the general formula $-[R_2SiO]_n-$, where n is at least 10, preferably at least 20 and more preferably at least 30, must also be present.

While the filler comprising component (ii) is not an essential component, it can be used to impart strength or color as necessary to the cured material comprising component (B). Examples of suitable fillers include but are not limited to fumed silica, hydrophobicized fumed silica, precipitated silica, hydrophobicized precipitated silica, fused silica, powdered quartz, diatomaceous earth, talc, aluminum silicate, alumina, aluminum hydroxide, calcium carbonate, zinc oxide, titanium dioxide, ferric oxide, glass fiber, glass beads, glass balloons, silicon carbide, nitrogen carbide, manganese carbonate, carbon black, graphite, cerium hydroxide, and various solid pigments.

The concentration of component (ii) can range from 0 to 100 parts by weight per 100 parts by weight of component (i).

The curing agent, identified hereinabove as component (iii), functions to cure component (i). The type of curing agent and the mechanism by which component B is cured are not critical to the ability of component B to interact with component A and provide the improved properties that characterize the present compositions.

Typical curing methods for component (i) include curing by a hydrosilation reaction in the presence of a platinum catalyst, curing using a free radical reaction by heating the ingredients of component B in the presence of an organoperoxide, and reacting an organopolysiloxane containing silicon-bonded hydroxyl or alkoxy groups with an organosilane having hydrolyzable groups in the presence or absence of a catalyst. Furthermore, any of these methods can be combined with the use of gamma radiation, ultraviolet radiation or electron beams.

The most preferred method for curing component B is by means of a hydrosilation reaction in the presence of a platinum-type catalyst using an organohydrogenpolysiloxane as the curing agent. The organohydrogenpolysiloxane can have a linear, cyclic, or network configuration, and may be a homopolymer or copolymer. It is to have at least 2 silicon-bonded hydrogen atoms in each molecule, and a viscosity of from 1 to 10,000 centipoise (0.001 to 10 Pa.s) at 25° C.

Linear and cyclic organohydrogenpolysiloxanes are preferred. In addition to the hydrogen atoms, the silicon-bonded organic groups of this compound consist of monovalent substituted and unsubstituted hydrocarbon radicals, including but not limited to methyl, ethyl, butyl, phenyl, and 3,3,3- trifluoropropyl. Methyl is particularly preferred among these.

When an organohydrogenpolysiloxane is used as the curing agent [component (iii)], component (i) must contain at least two silicon-bonded alkenyl groups in each molecule. and its preferred viscosity range is from 100 to 100.000 centipoise (0.1 to 100 Pa.s) at 25° C.

The organohydrogenpolysiloxane should be added in a quantity which will provide from 0.5 to 5, preferably from 0.7 to 2, silicon-bonded hydrogen atoms per silicon-bonded alkenyl group in component (i). An additional amount of component (iii) is required to react with component (iv), the ethylenically unsaturated phenol, and must be taken into consideration. Although the quantity of addition of component (iii) will vary with the quantity of addition of component (iv), the concentration of (iii) will generally be from 0.3 to 100 parts by weight per 100 parts by weight of component (i).

Examples of suitable platinum-type catalysts for the hydrosilation reaction include but are not limited to finely divided elemental platinum, finely divided platinum dispersed on carbon powder, chloroplatinic acid, chloroplatinic acid-olefin coordination compounds, chloroplatinic acid-vinylsiloxane coordination compounds, tetrakis(triphenylphosphine)palladium, and rhodium catalysts. The platinum-type catalyst is present in an amount equivalent to from 0.1 to 1000 parts by weight. preferably from 0.5 to 200 parts by weight, of platinum metal per one million parts by weight of component (i).

Examples of organoperoxides suitable for curing component (i) by a free radical reaction include 2,4-dichlorobenzoyl peroxide, benzoyl peroxide, dicumyl peroxide, di-t-butyl perbenzoate, and 2,5-bis(t-butylperoxy)benzoate. These organoperoxides are generally used in the range of from 0.1 to 10 parts by weight, preferably from 0.3 to 5 parts by weight per 100 parts by weight of component (i).

When an organosilane having hydrolyzable groups is used in the condensation reaction method, component (i) must then contain at least two silicon-bonded alkoxy or hydroxyl groups in each molecule. Furthermore, the organosilane must contain at least 2 silicon-bonded hydrolyzable groups in each molecule. Such organosilanes are exemplified by organoalkoxysilanes. organoacyloxysilanes, organooximesilanes, organoaminoxysilanes, organoaminosilanes, organoamidosilanes, organovinyloxysilanes, organoisocyanatosilanes, and their partial hydrolysis condensates. The organosilane is generally present at a concentration of from 0.1 to 20 parts by weight, preferably from 0.3 to 10 parts by weight per 100 parts by weight of component (i).

Component (iv), a substituted aromatic hydrocarbon compound containing at least one ethylenically unsaturated hydrocarbon radical or alkenyloxy group as a substituent on a benzene ring, is critical to improving the affinity between components (A) and (B) when component (B) is dispersed in component (A). This compound contains at least one benzene ring wherein at least one of the hydrogen atoms has been replaced with an ethylenically unsaturated hydrocarbon radical, such as vinyl or allyl, or an alkenyloxy group such as allyloxy, Examples of component (iv) include but are not limited to

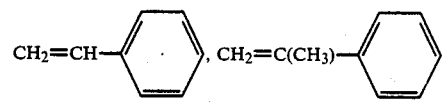

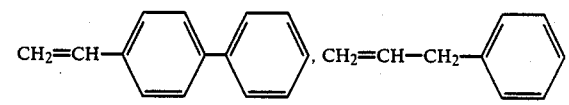

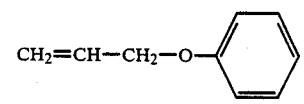

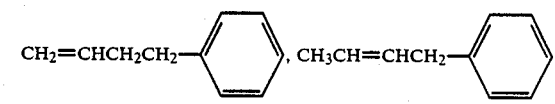

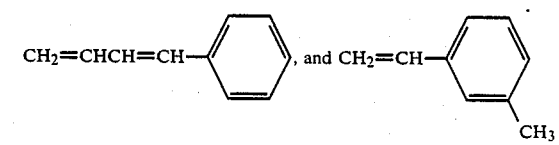

As one of the ingredients of component (B), component (iv) is generally simply added and mixed followed by the conversion of component (B) into a cured material. Alternatively, the cured material can also be obtained using the product obtained by reacting component (iv) in advance with one or more of the other ingredients of component (B).

For example, if component (B) is cured by a platinumcatalyzed hydrosilation reaction, the crosslinking agent can be a reaction product obtained by the partial addition of component (iv) to the organoydrogenpolysiloxane, component (iii). Furthermore, it is also possible at this time to make a supplementary addition of component (iv) or organohydrogenpolysiloxane.

Component (iv) is present at a concentration of from 0.1 to 50 parts by weight, preferably from 0.5 to 30 parts by weight, per 100 parts by weight of component (i). Affinity for the thermosetting resin will not be generated at lower concentrations. The presence of more than 50 parts of (iv) per 100 parts of (i) will adversely affect the physical properties of the cured material.

In addition to the aforementioned components (i) through (iv), component (B) may also contain reaction inhibitors, organic solvents, waxes, and mold release agents as required.

The cured form of component (B) can be pulverized using a grinder at room temperature or after freezing with dry ice, liquid nitrogen, or other suitable cooling agent. Alternatively, as disclosed in Japanese Laid Open Application No. 59/68333, a spherical cured material can be obtained by spraying the curable form of component (B) into a hot air current in the presence or absence of solvent. While the average particle size of the powder will vary with the application, it is generally no larger than 1 millimeter, preferably no larger than 300 microns, and most preferably no larger than 100 microns.

While the thermosetting resin composition of the present invention must consist of a dispersion of component (B) in component (A), mixing of these two components may be conducted at any stage and any mixing device can be used.

EXAMPLES

The following examples disclose preferred embodiments of the present thermosetting resin compositions and should not be interpreted as limiting the scope of the present invention as defined in the accompanying claims. Examples of compositions outside the scope of this invention are included for comparative purposes. In both the examples and comparative examples all parts are by weight unless otherwise indicated, and viscosity values were measured at 25° C. The properties of the cured compositions were measured using the following standards or methods.

(1) Thermal expansion coefficient: the sample was post-cured at 180° C. for 5 hours and measured according to ASTM D-696.
(2) Flexural modulus: determined by the flexural test method of JIS K-6911.
(3) Mold shrinkage ratio: determined by JIS K-6911 on the molding cooled to room temperature after molding in a metal mold.
(4) Shrinkage after post-cure: the molding of item (3) was post-cured under the conditions which are described in each example, cooled to room temperature, and then measured according to JIS K-6911.
(5) Scanning Electron Microscope (SEM) observation: the fracture surface of the test specimen from item (2) was inspected using the electron micrograph, and the affinity (adhesion) between component (B) and the thermosetting resin was evaluated based on the presence or absence of gaps.
(6) Water absorption: expressed as the weight change of a $2 \times \frac{1}{2} \times \frac{1}{4}$ inch ($50.8 \times 12.7 \times 6.4$ m) molding which had been post-cured and then immersed in boiling water for 10 hours.

Preparation of cured powders A and $A^1$

15 Parts methylhydrogenpolysiloxane, component (iii) having the formula

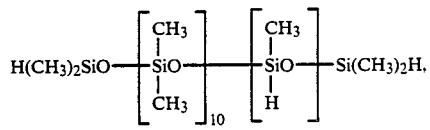

the combination of 2 parts styrene monomer and 3 parts allyl phenyl ether as component (iv), and a solution of chloroplatinic acid in isopropanol in an amount sufficient to provide 10 ppm platinum based on the weight of component (i) were added to 100 parts dimethylvinylsiloxy-terminated dimethylpolysiloxane [component (i)] having a viscosity of 800 centipoise (0.8 Pa.s). After mixing to homogeneity, curing was conducted in a forced convection oven at 150° C. for 1 hour, followed by cooling and pulverization. The material passing through a 100 mesh screen was designated as cured powder A.

For the comparison example, a cured powder was produced as described for powder A, with the exceptions that (1) the combination of styrene monomer and allyl phenyl ether [component (iv)] was omitted, and only 5 parts of the methylhydrogenpolysiloxane were added instead of the 15 parts used to prepare curable powder A. The cured composition was designated as cured powder $A^1$.

Production of cured powders B and $B^1$

100 Parts dimethylvinylsiloxy-terminated dimethylpolysiloxane having a viscosity of 1000 centipoise (1 Pa.s) and 5 parts of a methylphenylpolysiloxane resin composed of 40 mol % $CH_3SiO_{1.5}$ units, 10 mol % $C_6H_5(CH_3)SiO$ units, 40 mol % $C_6H_5SiO_{1.5}$ units, and 10 mol % $(C_6H_5)_2SiO$ units and containing 3 wt % silicon-bonded hydroxyl groups [component (i)] were mixed with 10 parts fused silica [component (ii)], 20 parts methylhydrogenpolysiloxane [component (iii)] having the formula

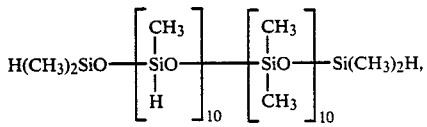

15 parts allylbenzene [(component (iv)], an amount of isopropanolic chloroplatinic acid equivalent to 10 ppm of platinum based on the weight of component (i), and 0.1 part 3-methyl-1-butyne-3-ol as reaction inhibitor. This was heated and cured in a forced convection oven at 150° C. for 1 hour and then cooled and pulverized.

The material passing through a 100 mesh screen was designated cured powder B.

For the comparison example, a cured powder B¹ was produced using the same procedure and ingredients descibed for cured powder B, with the exceptions that the allylbenzene [component (iv)] was omitted from the above composition and the amount of methylhydrogenpolysiloxane was reduced to 5 parts. The cured material is referred to as cured powder B¹.

Production of cured powders C and C¹

500 Parts toluene, 100 parts of a methylhydrogenpolysiloxane having the formula

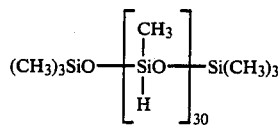

and a quantity of isopropanolic chloroplatinic acid equivalent to 5 ppm platinum based on the total quantity of starting material for the reaction were added to a stirrer-equipped four-neck flask and mixed until a solution was obtained, 90 Parts alpha-methylstyrene [component (iv)] was then dripped in at 70° C. followed by heating for 5 hours. At this time the toluene was removed by distillation to yield an oil. The infra-red absorption spectrum of the oil revealed the presence of silicon-bonded hydrogen atoms and no ethylenic unsaturation. Based on these data it was concluded that 1) the oil consisted of the initial methylhydrogenpolysiloxane wherein a portion of the silicon-bonded hydrogen atoms had reacted with the alpha-methylstyrene, and 2) the oil could be used as an addition-reaction curing agent.

15 Parts of the oil prepared as described in the immediately preceding paragraph and an amount of isopropanolic chloroplatinic acid equivalent to 5 ppm platinum based on the weight of component (i) were added and mixed into 100 parts of a dimethylvinylsiloxy-terminated dimethylpolysiloxane having a viscosity of 100 centipoise (0.1 Pa.s) [component (i)]. The resultant composition was cured by spraying it through a rotary nozzle into a spray dryer wherein the hot air inlet temperature measured 230° C. The resultant cured particles exhibited diameters of from 1 to 50 microns and are referred to as cured powder C.

For the comparison example, cured particles were produced by the procedure described for cured powder C, with the exception that the methylhydrogenpolysiloxane/alphamethylstyrene reaction product was replaced with 5 parts of the unreacted methylhydrogenpolysiloxane. The resultant spherical cured particles are referred to as C¹.

Production of cured powders D and D¹

100 Parts of a dimethylpolysiloxane gum composed of 99.5 mol % dimethylsiloxy units and 0.5 mol % methylvinylsiloxy units [component (i)], 10 parts fumed silica [component (ii)], 0.75 parts 2,4-dichlorobenzoyl peroxide [component (iii)], and 5 parts allyl biphenyl (component (iv)) were combined and mixed. followed by vulcanization at 120° C, under a pressure of 30 kg/cm² (2943 kPa) for 10 minutes. cooling. and pulverization. The material passing through a 100 mesh screen is referred to as cured powder D.

For the comparison example, cured powder D¹ was obtained by following the procedure used for cured powder D with the exception of omitting component (iv).

Production of cured powder E

In this comparison example, the methylpolysilsesquioxane produced by the hydrolysis condensation of methyltrichlorosilane and passing the resultant product through a 100 mesh screen was designated as cured powder E.

EXAMPLE 1

6 Parts cured powder A, 68 parts fused quartz powder, 4 parts hexamethylenetetramine, and 1 part carnauba wax were kneaded on a hot roll at 70° C. into 32 parts of a phenol novolac resin having a softening point of 80° C. and a hydroxyl group equivalent weight of 100. Pulverization of the resultant product yielded a thermosetting phenol novolac resin composition.

This resin composition was then transfer molded at 175° C. under a pressure of 70 kg/cm² (6867 kPa) for 3 minutes and then post-cured at 150° C. for 2 hours. The properties of this molding are reported in Table 1.

In the comparison examples. moldings were produced as described in the preceding portion of this Example but either replacing cured powder A with 6 parts of cured powder A1 or omitting the cured powder [Component (B)] from the composition. Properties of the moldings were measured, and these results are also reported in Table 1.

TABLE 1

| Composition and Physical Properties | Example 1 | Comparison Examples 1 | 2 |
|---|---|---|---|
| (i) phenol novolac resin (parts) | 32 | 32 | 32 |
| (ii) cured powder A (parts) | 6 | — | — |
| A¹ (parts) | — | 6 | — |
| mold shrinkage ratio (%) | 0.09 | 0.09 | 0.28 |
| shrinkage after post-cure (%) | 0.13 | 0.13 | 0.22 |
| flexural modulus (kg/mm²) | 1020 | 1050 | 1410 |
| thermal expansion coefficient (× 10⁵/degree C.) | 0.4 | 0.5 | 1.5 |
| observation (gaps) | none | yes | — |
| water absorption (%) | 0.44 | 0.49 | 0.34 |

EXAMPLE 2

Thermosetting phenol novolac resin compositions were produced as described in Example 1 with the exception that 6 parts of either cured powder B or cured powder B¹ were used in place of cured powder A of Example 1. The resultant compositions were molded and evaluated as described in Example 1. and the results are reported in Table 2. The data for Comparison Example 2 from Example 1 is repeated in Table 2 for reference purposes.

TABLE 2

| Composition and Physical Properties | Example 2 | Comparison Examples 3 | 2 |
|---|---|---|---|
| (i) phenol novolac resin (parts) | 32 | 32 | 32 |
| (ii) cured powder B (parts) | 6 | — | — |
| B¹ (parts) | — | 6 | — |
| mold shrinkage ratio (%) | 0.08 | 0.08 | 0.28 |
| shrinkage after post-cure (%) | 0.11 | 0.16 | 0.22 |
| flexural modulus (kg/mm²) | 1020 | 1010 | 1410 |
| thermal expansion coefficient (× 10⁵/degree C.) | 0.4 | 0.4 | 1.5 |

TABLE 2-continued

| Composition and Physical Properties | Example 2 | Comparison Examples 3 | Comparison Examples 2 |
|---|---|---|---|
| observation (gaps) | none | yes | — |
| water absorption (%) | 0.41 | 0.51 | 0.34 |

EXAMPLE 3

6 Parts cured powder C, 70 parts fused quartz powder, 0.6 parts carnauba wax, and 0.25 parts aluminum benzoate were blended to homogeniety with 32 parts of a thermosetting polyimide resin (BT2480 from Mitsubishi Gas Chemical) on a hot roll maintained at a temperature of 90° C. Pulverization of the resultant material yielded a thermosetting polyimide resin composition.

This resin composition was transfer molded at 200° C. for 6 minutes under a pressure of 70 kg/cm² (6867 kPa), and then post-cured at 230° C. for 3 hours. The properties listed in Table 3 were then measured.

The samples for the comparison examples were prepared by either using 6 parts cured powder $C^1$ in place of cured powder C or omitting the cured powder from the composition. The properties of the moldings were measured and are also reported in Table 3.

TABLE 3

| Composition and Physical Properties | Example 3 | Comparison Examples 4 | Comparison Examples 5 |
|---|---|---|---|
| (i) polyimide resin (parts) | 32 | 32 | 32 |
| (ii) cured powder C (parts) | 6 | — | — |
| $C^1$ (parts) | — | 6 | — |
| mold shrinkage ratio (%) | 0.56 | 0.58 | 0.66 |
| shrinkage after post-cure (%) | 0.31 | 0.32 | 0.49 |
| flexural modulus (kg/mm²) | 920 | 950 | 1280 |
| thermal expansion coefficient ($\times 10^5$/degree C.) | 1.6 | 1.6 | 1.8 |
| observation (gaps) | none | yes | — |
| water absorption (%) | 0.52 | 0.59 | 0.48 |

EXAMPLES 4 and 5

22 Parts of a cresol novolac epoxy resin having a softening point of 80° C. and an epoxy equivalent weight of 220, 11 parts of the same type of phenol novolac resin used in Example 1, 10 parts cured powder A or D as specified in Table 4, 67 parts fused silica 0.4 parts carnauba wax. and 0.1 part 2-methylimidazole were combined and kneaded on a roller mill heated to 90° C., followed by pulverization to yield a thermosetting epoxy resin composition. The resin composition was in each case transfer molded for 2 minutes at 175° C. under a pressure of 70 kg/cm², after which it was post-cured at 180° C. for 12 hours. The properties of the resultant moldings reported in Table 4 were then measured. The moldings for the comparison examples were produced as described in the preceding section of this example from (1) material containing 10 parts $A^1$ in place of cured powder A, (2) material containing 10 parts $D^1$ in place of D, and (3) material which did not contain any cured powder. The properties listed in Table 4 were then measured for each of the compositions.

TABLE 4

| Composition and Physical Properties | Examples 4 | Examples 5 | Comparison Examples 6 | Comparison Examples 7 | Comparison Examples 8 |
|---|---|---|---|---|---|
| (i) cresol novolac epoxy resin (parts) | 22 | 22 | 22 | 22 | 22 |
| phenol novolac resin (parts) | 11 | 11 | 11 | 11 | 11 |
| (ii) cured powder A (parts) | 10 | — | — | — | — |
| D | — | 10 | — | — | — |
| $A^1$ | — | — | 10 | — | — |
| $D^1$ | — | — | — | 10 | — |
| mold shrinkage ratio (%) | 0.38 | 0.39 | 0.35 | 0.36 | 0.49 |
| shrinkage after post-cure (%) | 0.28 | 0.26 | 0.26 | 0.28 | 0.47 |
| flexural modulus (kg/mm²) | 850 | 880 | 890 | 880 | 1250 |
| thermal expansion coefficient ($\times 10^5$/degree C.) | 1.6 | 1.7 | 1.7 | 1.7 | 2.4 |
| observation (gaps) | none | none | yes | yes | — |
| water absorption (%) | 0.31 | 0.32 | 0.37 | 0.39 | 0.27 |

EXAMPLE 6

6 Parts cured powder B as shown in Table 5, 72 parts fused quartz powder, and 1 part carnauba wax were kneaded on a hot roll heated at 90° C. into 14 parts methylphenylpolysiloxane resin composed of 40 mol % $CH_3SiO_{1.5}$ units, 10 mol % $C_6H_5(CH_3)SiO$ units, 40 mol % $C_6H_5SiO_{1.5}$ units, and 10 mol % $(C_6H_5)SiO$ units and containing 3 wt % silicon-bonded OH groups and 14 parts cresol novolac epoxy resin (softening point = 80° C., epoxy equivalent weight = 220). Removal of the material from the mill followed by pulverization yielded a thermosetting silicone-epoxy resin composition. This resin composition was then transfer molded at 175° C. under a pressure of 70 kg/cm² for 2 minutes and then post-cured at 180° C. for 12 hours. The properties of this molding listed in Table 5 were then measured.

In the comparison examples, moldings were produced using 6 parts cured powder E in place of cured powder B, or without the addition of any cured powder. The various properties were measured and these results are also reported in Table 5.

TABLE 5

| Composition and Physical Properties | Example 6 | Comparison Examples 9 | Comparison Examples 10 |
|---|---|---|---|
| (i) silicone resin (parts) | 14 | 14 | 14 |
| epoxy resin (parts) | 14 | 14 | 14 |
| (ii) cured powder B (parts) | 6 | — | — |
| E (parts) | — | 6 | — |
| mold shrinkage ratio (%) | 0.32 | 0.45 | 0.49 |
| shrinkage after post-cure (%) | 0.29 | 0.34 | 0.40 |
| flexural modulus (kg/mm²) | 1060 | 1160 | 1390 |
| thermal expansion coefficient ($\times 10^5$/degree C.) | 2.2 | 2.6 | 2.8 |
| observation (gaps) | none | yes | — |
| water absorption (%) | 0.48 | 0.51 | 0.40 |

Because the cured organosiloxane material is dispersed in the thermosetting resin as finely divided particles, the cured products obtained from the thermosetting resin compositions of this invention characteristically have reduced water infiltraton compared with compositions containing prior art organosiloxane compositions as the dispersed phase. In addition, the cured thermosetting compositions exhibit high flexibility, a low coefficient of thermal expansion and low post-molding shrinkage. As a consequence, the thermoset- That which is claimed is:

1. A thermosetting resin composition comprising
   (A) 100 parts by weight of a continuous phase comprising a thermosetting organic resin or a thermosetting silicone resin and
   (B) from 0.1 to 100 parts by weight of a finely divided dispersed phase consisting essentially of the product obtained by curing a composition comprising
       (i) 100 parts by weight of a curable organopolysiloxane having a viscosity of at least 0.01 Pa.s at 25 degrees C.
       (ii) from 0 to 100 parts by weight of a filler,
       (iii) from 0.3 to 100 parts by weight of a curing agent for said organopolysiloxane, said curing agent being selected from the group consisting of organohydrogensiloxanes in the presence of a platinum-containing hydrosilation catalyst, organic peroxides and organosilanes containing hydrolyzable groups,
       and
       (iv) from 0.1 to 50 parts by weight of a substituted aromatic hydrocarbon compound comprising a benzene ring having at least on substituent selected from monovalent ethylenically unsaturated hydrocarbon radicals or alkenyloxy radicals, or mixtures of said compound
   with the proviso that (1) when the curing agent is an organohydrogenpolysiloxane it can be present as a mixture with said aromatic hydrocarbon compound or as the reaction product of said organohydrogenpolysiloxane and said hydrocarbon compound, and said organopolysiloxane contains at least two silicon-bonded alkenyl groups per molecule, and when said curing agent is an organosilane containing hydrolyzable groups said organopolysiloxane contains silicon-bonded hydroxyl or alkoxy groups.

2. A composition according to claim 1 wherein the thermosetting resin comprising component (A) is an eposy resin, phenolic resin, imide resin, or silicone resin, said ehtylenically unsaturated hydrocarbon radicals are vinyl, allyl or 1,3-butadienyl, said alkenyloxy radicals are allyloxy, and said curing agent is an organic peroxide, and organohydrogenpolysiloxane or said reaction product, and the average particle size of the dispersed phase is no large than 1 millimeter.

3. A composition according to claim 2 wherein the average particle size of said dispersed phase is no larger than 300 microns and said hydrocarbon compound is selected from at least one member selected from the group consisting of

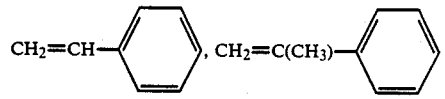

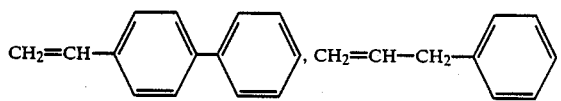

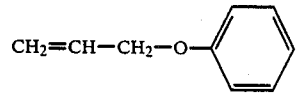

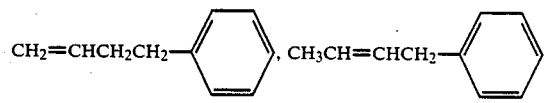

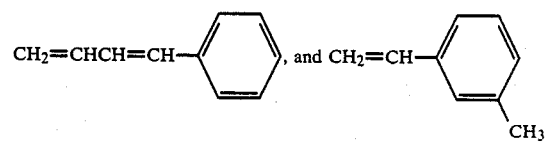

4. A composition according to claim 3 wherein the average particle size of said dispersed phase is no larger than 100 microns, said hydrocarbon compound is selected from the group consisting of mixtures of styrene monomer and allyl phenyl ether, allylbenzene, alpha-methylstyrene, and allyl biphenyl, and the curing agent is said reaction product.

5. A composition according to claim 4 wherein said curable organopolysiloxane is a dimethylvinylsiloxy terminated dimethylpolysiloxane and the curing agent is a dimethylsiloxane/methylhydrogensiloxane copolymer.

6. A composition according to claim 4 wherein said curable organopolysiloxane is a dimethylsiloxane/methylvinylsiloxane copolymer and said curing agent is an organic peroxide.

* * * * *